United States Patent [19]

Ojima

[11] Patent Number: 4,457,497

[45] Date of Patent: Jul. 3, 1984

[54] SPRING BALANCER FOR PIVOTABLE COVER LID

[75] Inventor: Juji Ojima, Ebina, Japan

[73] Assignee: NHK Spring Co., Ltd., Yokohama, Japan

[21] Appl. No.: 261,665

[22] Filed: May 7, 1981

[30] Foreign Application Priority Data

May 8, 1980 [JP] Japan ............................ 55-63046[U]

[51] Int. Cl.³ .............................................. F16F 9/00
[52] U.S. Cl. ..................................... 267/9 R; 16/197; 188/67; 188/129
[58] Field of Search ................................. 16/197-201, 16/76, 72, 85, 63-65, 49, 86, 82; 188/67, 129, 271, 381; 292/338; 267/8, 9, 134, 151, 152, 155, 58, 120, 66-68, 69-70, 136, 140.1, 140.2

[56] References Cited

U.S. PATENT DOCUMENTS

| 1,205,433 | 11/1916 | Christman | 188/129 |
| 2,604,655 | 7/1952 | Peremi | 16/197 |
| 2,646,860 | 7/1953 | Pirard | 188/67 X |
| 2,750,994 | 6/1956 | Howell, Jr. | 188/67 X |
| 2,774,100 | 12/1956 | Larson et al. | 16/197 |
| 2,940,552 | 6/1960 | Freyler | 188/67 X |
| 3,478,384 | 11/1969 | Skolnik | 16/197 |

FOREIGN PATENT DOCUMENTS

| 2019134 | 11/1971 | Fed. Rep. of Germany | 188/129 |
| 50164 | 1/1966 | German Democratic Rep. | 188/129 |

Primary Examiner—Douglas C. Butler
Attorney, Agent, or Firm—Fleit, Jacobson, Cohn & Price

[57] ABSTRACT

A balancer is installed between a fixed body and a lid attached to the fixed body pivotably through a horizontal revolution axis. This balancer is a spring balancer for a pivotable cover lid having a compression coil sring which acts in compression or extension and a rod which transfers into a metallic cylinder according to the revolution of the cover lid. Further, this balancer has the overall characteristics of the compression coil spring and the sliding friction characteristics of the rod.

4 Claims, 3 Drawing Figures

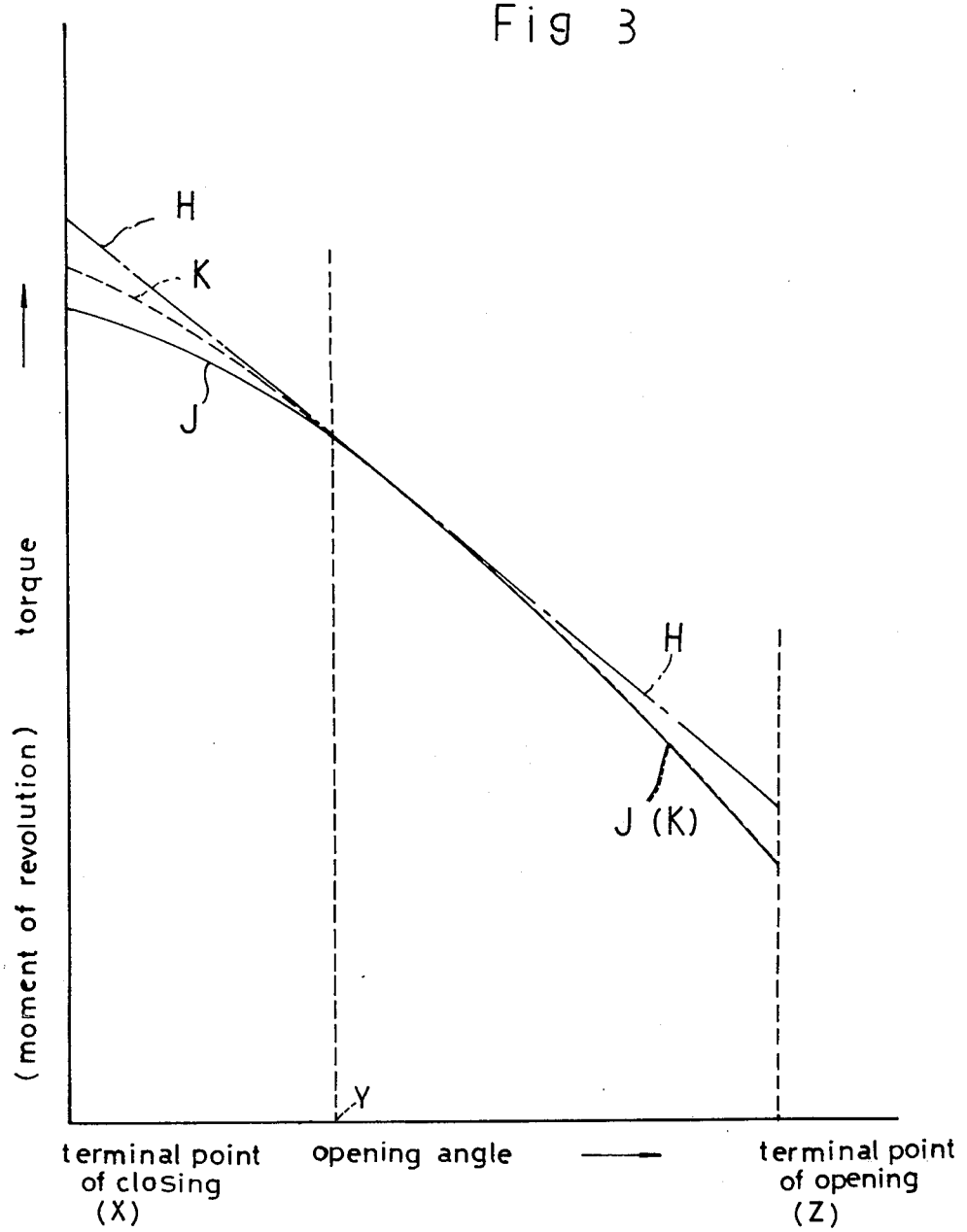

SPRING BALANCER FOR PIVOTABLE COVER LID

BACKGROUND OF THE INVENTION

This invention relates to a spring balancer for pivotable cover lid having a heavy weight which opens or closes upward and downward around horizontal axis (hereafter merely called "spring balancer").

The moment of revolution of the lid secured rotatively in upper and lower directions to a fixed body through a horizontal axis changes according to the change of a revolution angle of the lid. A balancer of this invention is attached between said lid and the fixed body and adapted to act a resistant force against a gravity direction on the lid, thereby preventing an impact rotation of the lid or enabling the stop of the lid at an arbitrary rotation angle.

As an example for operating such heavy lid which opens or closes in both upper and lower directions around the horizontal axis, there is an office machine, for instance, a copy apparatus.

Heretofore, since the lid which is opened or closed at the times of inspection and maintenance is heavy, a hinge wherein a torsion spring or the like energizes said lid in the opening direction is used close by the rotation axis in order to decrease the operation force.

In this case, however, a wide space is not only required for attaching the spring near the horizontal axis, but it is also difficult to design the spring characteristics to agree with the change of the moment of revolution of the lid. Therefore, the above spring has such a defect as changing the opening or closing action of the lid into an impact motion or a difficulty to stop the lid at an arbitrary position within the range of a full process in opening and closing.

Further, there exists a balancer wherein a compression coil spring is incorporated therein other than the above hinge. Such a balancer, however, has such defect as causing a wearing damage by the contact of the compression coil spring with other structural member made of metal at the time of the action of the balancer or an occurrence of a creaky noise by this contact.

Various kinds of invention have been performed in order to remove these defects mentioned above. For instance, such invention as coating the compression coil spring with a grease or the like, or forming the structural member other than the compression coil spring with a synthetic resin material, has been performed. However, the former is only a temporary means of a solution wherein a troublesome operation such as recoating of the grease is requested, and in the latter a new problem such as the deterioration of the mechanical strength of the balancer occurs since it is made of synthetic resin. Therefore, these are not practical means of solution for removing the defect of the compression coil spring.

Further, in case of no employment of the hinge or the balancer described above, there exists such one wherein a gas spring or an oil spring is laid between the lid and the body at a position spaced from the horizontal axis. In these balancer, though it is comparatively easy to agree its properties with the moment of the revolution of the lid, the cost becomes high because of the necessity of a sealing technique for prevention of the gas or the oil leakage, and further a complete maintenance of the sealing for a long period is also impossible. Accordingly, since the gas or oil leakage occurs by all means, the reliability as the balancer is low.

Furthermore, since the both of the gas and oil springs change the properties respectively according to the change of a temperature, these springs have such defects as difficulty in maintaining the performance of balancer always constant.

Accoringly, this invention is performed with the object of amending these defect.

SUMMARY OF THE INVENTION

It is an object of this invention is to provide a spring balancer to maintain always a constant balance performance.

Another object of this invention is to provide a spring balancer which can stop at an arbitrary position through the whole process of opening or closing of the lid in accordance with the necessity together with being capable of operating the opening or closing of the lid smoothly with a small force availing the overall characteristics of the spring properties of the compression coil spring and the frictions which cause between said coil and a rod conforms to the compressive action of the coil spring and a friction ring and between a guide member and a metal cylinder and designing the overall characteristics to fit to the change of the moment of the revolution of the lid.

A further object of this invention is to provide a spring balancer which can prevent an impact opening action at an opening end by designing the above overall characteristics so that it may be slightly over the moment of the revolution of the lid near the closing end position of the lid and fit to said moment of the revolution in other opening and closing processes, thereby being allowed to stop the lid in a slightly opening state when the locking of the lid is released at the closing end point.

Still further object of this invention is to provide a spring balancer having an excellent durability by forming structural members necessary for the mechanical strength with metals and securing a member made of synthetic resin having a buffer effect of sound erasing to a contact position at the time of the operation of the compression coil spring, thereby being capable of preventing the creaking or the wearing damage between structural members.

Still more object of this invention is to provide a spring balancer which can display the spring properties of the compression coil spring through the whole opening and closing processes by preventing the buckling according to the compressive action of the compression coil spring through the whole opening and closing processes of the lid without interference to other members by the buckling.

Now, the embodiment features and the effects of this invention will be described referring to the attached drawings as follows.

BRIEF DESCRIPTION OF THE DRAWINGS

FIG. 3 is a graph which shows a relation between an opening angle of the lid and a spring torque (H) of the compression coil spring used in this invention as an example of the comparison together with showing a relation between properties (K) of the spring balancer with respect to an opening angle of the lid and the revolution moment (J) of the lid in case of suspending the spring balancer of this invention between the body and the lid connectively as shown in FIG. 2.

DETAILED DESCRIPTION OF THE INVENTION

Figure 1:
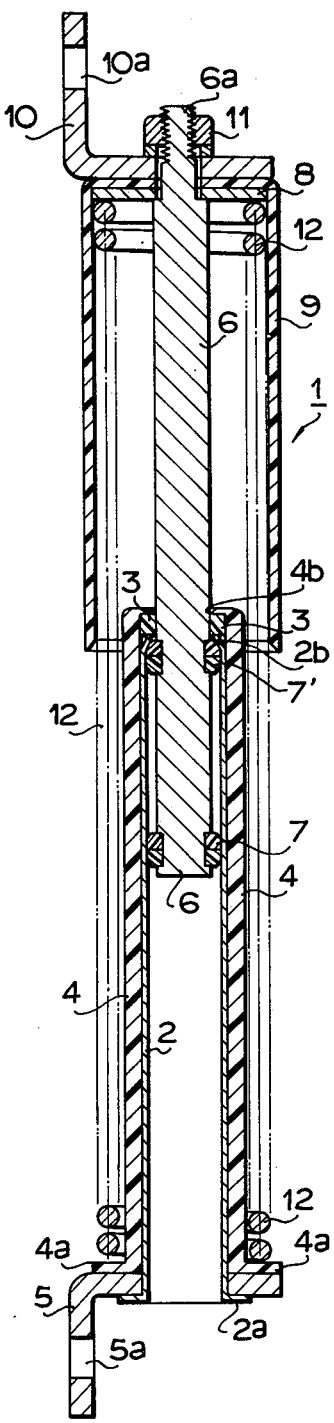
FIG. 1 is a longitudinal sectional view of an example of the spring balancer according to this invention in a free state.

Referring now to FIG. 1, there is shown a spring balancer 1.

The numeral 2 is a metal cylinder having a flange brim 2a at one end thereof and a slightly smaller diameter at another end thereof. There is fixed a friction ring 3 made of synthetic resin at the end of the small diameter 2b.

The numeral 4 is a silencer wherein a bottom made of a synthetic resin having a flange 4a at an opening end thereof and a penetrating hole 4b through the bottom wall is fixedly coated on the metal cylinder 2 so that the flange 4a and the penetrating hole 4b may correspond to the flange 4a of the metallic cylinder and a small diameter portion 2b respectively. The numeral 5 is an angular bracket, said bracket being pinchingly attached between the flange 2a of the metallic cylinder 2 and the flange 4a of the silencer 4 being inserted like a sandwich. The numeral 6 is a rod; at the outer circumference of one end thereof, there are projected guide members, 7 and 7', made of synthetic resin, and at another end portion thereof a male screw portion 6a having a step is formed. One end of the rod 6 is inserted into the metallic cylinder 2 in a state that said members, 7 and 7', are adapted to abut to the inside of said metalic cylinder, and another end thereof is adapted to protrude to the outside of the metallic cylinder 2 penetrating the small diameter portion 2b of the metallic cylinder 2, the friction ring 3 and the penetrating hole 4b of the silencer 4, thereby being connected with the metallic cylinder 2 slidably in the axial direction. The guide member 7' positioned at the intermediate portion of the rod 6 has a stopper function to prevent catapulting of the rod together with the small diameter portion 2b of the metallic cylinder 2.

Further, the numeral 9 is a guide cylinder made of synthetic resin having a bottom, the inner diameter of said guide cylinder being considerably larger than that of the metallic cylinder 2 coated with silencer 4 thereon. The opening side of said guide cylinder 9 is orientated at the side of the penetrated hole 4b of the silencer 4 and the bottom portion thereof is held by a plate member 8 abuts from the inside and an angular bracket 10 abuts from the outside, whereby the guide cylinder 9 is clamped with a nut 11 screwed with a screw portion 6a of the rod 6 which penetrates therethrough.

The structure of the silencer 4 is not defined by that described above. It may be structured by a coated film of the synthetic resin formed on the surface of the metallic cylinder 2. Furthermore, the guide cylinder 9 is also not defined by the above structure, but the length of the cylinder is enough to be at least a cylinder length which allows to insert the coil portion inserted the rod 6 of the compression coil spring 12 therein along the outer surface of the cylinder length. The inner diameter is designed to be nearly equal to the outer diameter of the spring 12 considering that the compression coil spring 12 is slightly enlarged at the time of the compression operating.

The spring balancer is constructed as described above and the compression coil spring 12 is adapted to energize so as to set apart the brackets 10 and 5. The energization in a free state, as shown in FIG. 1, becomes maximum in distance between the attaching hole 10a of the bracket 10 and hole 5a of the bracket 5 by collision of the guide member 7' protruded from rod 6 with the small diameter portion 2b of the cylinder 2 to restrict it.

Then, the action of the spring balancer will be described referring to FIG. 2 and FIG. 3.

Figure 2:
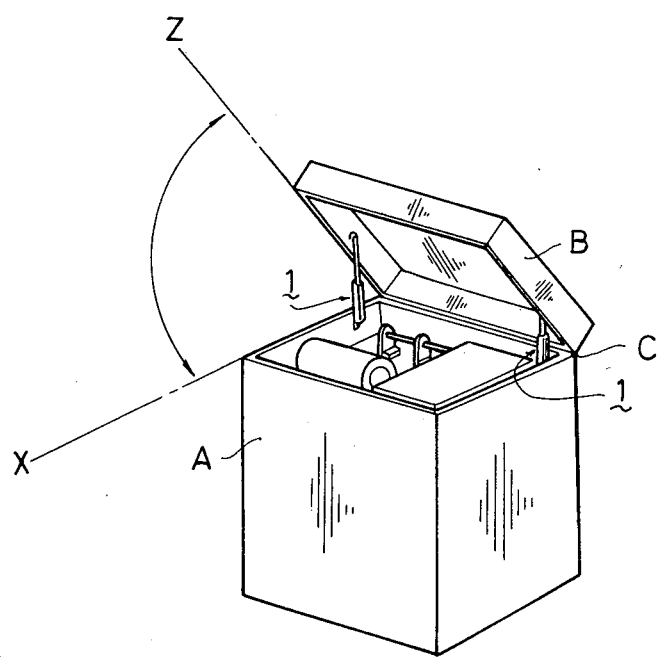
FIG. 2 is an explanation view which shows a state of use of the spring balancer according to this invention.

FIG. 2 is a schematic illustration of the materials of the copy machine, wherein A is a body and B is a lid, said B being adapted to perform the opening or closing action around a revolution axis C.

Further, X and Z are the terminal points of the closing and the opening of the lid B respectively.

The brackets 5 and 10 of the spring balancer 1 are pivotally attached to the lid B and the body A respectively through each bracket hole 5a and 10a. In this pivotal attachment, the moment of revolution of the lid B is adapted to be equivalent to the reaction force of the compression coil spring at an approximately intermediate portion within the revolution range of the lid B.

The spring balancer 1 contracts when the lid B performs a closing action from the opening terminal point Z to the closing terminal point X, while said balancer expands when said lid B perfoms an opening action. The extension or shrinkage of the spring balancer 1 is followed by the action of going in or out of the rod 6 with respect to the metallic cylinder 2 and the expansion or compression of the compression coil spring 12. The action of said rod 6 with respect to the cylinder 2 is guided by the guide members 7 and 7' protruding from the rod 6 sliding along the inner wall of the metallic cylinder 2 which causes the friction between rod 6 and friction ring 3, and guide members 7, 7' and the inner wall of the metallic cylinder 2. The friction caused by said guide members 7 and 7' is obtained according to the necessity. Therefore, in case of only obtaining a guide performance, said guide members may be constructed by a low friction material. Thus, the spring balancer 1 has a overall characteristics including the spring torque characteristics of the compression coil spring 2 and said friction characteristics.

The spring balancer 1 suitable for each use can be obtained by designing the characteristics of the spring balancer 1 in the relation of the revolution moment of the lid B. This will be described referring to FIG. 3.

FIG. 3 is a graph which shows the relation between opening angle of the lid B and the torque. In FIG. 3, H shows the characteristics in case when the friction ring 3 is not secured in the equipment 1 of this invention; in other words, it shows the characteristics of the compression coil spring, and J and K show the revolution moment of the lid B and the characteristics of the balancer 1 according to this invention respectively.

As understood from FIG. 3, the characteristics which agree with the revolution moment J of the lid B can not be obtained only from the compression coil spring 12 however designed the spring constant may be.

In FIG. 3, the characteristics of compression coil spring 12, H and the moment of revolution of the lid B, J agree with each other only within very narrow range. Thus, it is impossible to maintain an arbitrary angle to stop the lid B which acts from the terminal point of closing (X) to that of opening (Y) by such very narrow range of the agreement. Accordingly, the lid B initiates naturally an opening operation.

In other words, the above natural opening action is caused by the fact that the restriction of the force of inertia is impossible by such narrow range described above.

Further, even if the opening angle of the lid B is designed artificially so as to agree with such range as described above, it is not only difficult to design and maintain the above opening angle of the lid B, but also the lid B naturally initiates an opening operation when the range is slightly biased in the opening direction from the range described above due to the vary narrow range.

The balancer 1 in accordance with this invention is, as described above, is attached between the lid B and the body A so that the magnitude of the moment of revolution of the lid B may be equivalent to that of the reaction force of the compression coil spring 12 at approximately intermediate position of the range of the revolution of the lid B. However, even if the position of the lid B transfers to the closing or the opening direction from said intermediate position, the natural revolution more than that of at the transferred position is obstructed by the sliding friction of the rod, thereby being able to stop the lid B maintaining an arbitrary opening angle within a side range of the revolution.

Further, the sliding friction of said rod 6 is not so great that the stopped lid B at an arbitrary angle can be operated with small force.

In this invention, the balancer characteristics agree with the revolution moment J of the lid B can be obtained for the first time by the overall properties of the spring characteristics of the compression coil spring 12 with the sliding friction of the rod 6. This is the most important feature of this invention.

The characteristics of the balancer 1 according to this invention can be not only designed properly so as to obtain the properties agree with the revolution moment J of the lid B, but also can obtain the properties slightly over the revolution moment of the lid B near the terminal point of closing X of the lid B as shown by K in FIG. 3.

Further, when the spring balancer 1 is designed to obtain the K characteristics shown in FIG. 3, since the lid B at nearly the terminal point of closing X is energized in the opening direction by the spring balancer, the lid B is stopped at Y in FIG. 3 in a state of slightly opening the lid when the locking is released, thereby being able to prevent the impact opening action to the terminal point of opening Z. The opening action hereafter can be operated with a small force as same as described above.

Further, in the balancer 1 of this invention, since the guide cylinder 9 made of synthetic resin is provided together with attaching the silencer 4 to the metallic cylinder 2 at the outer surface thereof when the compression coil spring 12 contacts thereto at the time of its operating in spite of incorporation of the metal compression coil spring 12, there is neither fear of causing the wearing damage even when the compression coil spring 12 contacts with said silencer 4 and guide cylinder 9, nor the occurrence of a creaky noise caused by contacts with said synthetic resin material respectively.

Furthermore, in the balancer 1 of this invention, since the guide members 7, 7' and the friction ring 3 are made of synthetic resins respectively, even if each of these collides with the compression spring 12 by vigorous restoring force, there is no occurrence of impact sound appearing in the case of metals.

Further, in the spring balancer of this invention since the metallic cylinder 2, rod 6, and the brackets, 5 and 10 which are requested for mechanical strength are made of metals, the strength of the spring balancer 1 is sufficiently guaranteed.

Still further, in the spring balancer 1 according to this invention, buckling phenomenon of the compression coil spring 12 at the time of operation is prevented by mounting the guide cylinder 9 wherein the coil portion of the compression coil spring 12 is inserted along the inner circumference thereof. Accordingly, there exists no interference to other parts by the buckling of the coil and the spring properties of the compression coil spring 12 can be always obtained in a normal state.

Still furthermore, in the spring balancer 1 of this invention, since the structure is very simple and a low cost compression coil spring is used, a remarkable decrease of the cost can be attained compared with the conventional gas or oil spring balancer.

It is needless to say that the synthetic resin of this invention can be employed with a hard rubber such as a synthetic rubber or the like as far as it is not deviated from the range of the purpose of this invention.

What I claim is:

1. A spring balancer for a pivotable cover lid, said balancer comprising: a rod having one end portion thereof movably carried in an axial direction in a metallic cylinder that is exteriorly coated with a synthetic resin layer, one end of the rod attached to a bracket spaced from one end portion of said metallic cylinder, a guide cylinder made of synthetic resin having a larger inner diameter than the outer diameter of said metallic cylinder and having an end therof closed and secured to said one end of said rod at said bracket, the open end of said guide cylinder overlying said metallic cylinder, and a compression coil spring positioned within said guide cylinder and overlying said metallic cylinder and said rod, one end of said spring contacting the closed end of said guide cylinder and the other end contacting the bracket of the metallic cylinder, said balancer installed between a fixed body and a movable lid attached pivotally to said fixed body through a horizontal revolution axis so that the magnitude of the moment of revolution of said lid may be offset by the reaction force of said compression coil spring at an intermediate position within the range of movement of said lid, said spring balancer including a fixed diameter friction ring fixed to one of said rod and said metallic cylinder to frictionally engage the other of said cylinder and said rod, respectively, so as to provide a friction force when said rod transfers in the axial direction.

2. A spring balancer according to claim 1 wherein said metallic cylinder is structured by externally and closely inserting a synthetic resin layer formed as a separate body from said metallic cylinder along said metallic cylinder.

3. A spring balancer according to claim 1 wherein said metallic cylinder includes an external synthetic resin coating film.

4. A spring balancer according to claim 1 wherein said rod is guided to transfer in an axial direction by guide members consisting of a pair of synthetic members, said pair of members being fixed to one end of said rod inserted into said cylinder at a space in the axial direction together with sliding along the inner wall of said metallic cylinder.

* * * * *